May 10, 1938.  J. P. HANSEN  2,117,093
BLOWING DEVICE FOR POWDERS
Filed Aug. 7, 1934

Inventor:
Jens Peter Hansen

Patented May 10, 1938

2,117,093

UNITED STATES PATENT OFFICE 2,117,093

BLOWING DEVICE FOR POWDERS

Jens Peter Hansen, Copenhagen, Denmark

Application August 7, 1934, Serial No. 738,859
In Denmark August 8, 1933

1 Claim. (Cl. 43—146)

In the fight against noxious animals, bacteria, fungus and the like, particularly with reference to gardens, there is now generally employed powdering with various kinds of powders, all in accordance with the kinds of plants or trees that are to be protected, or with the insects or bacteria to be destroyed.

Hitherto such powdering has been effectuated in such a manner that the powder is poured into the interior of the blower used, whereupon it is ejected directly from the blower. In this manner it is unavoidable that remnants of the previously employed powder are ejected together with the subsequent filling, and this may occasion accidents if by mistake there is ejected poisonous powder on plants or fruit intended for food. Likewise it is possible when the blower has been set aside filled with poisonous powder that the operator forgets what the contents are and employs them in the belief that it is a non-poisonous powder.

The present invention relates to a blower for powders and a container for the powder to be used in connection with the blower, and the object of the invention is to provide means for ejecting the powder directly from the container and preventing its contact with the interior of the blower, so that mistakes such as those indicated above are eliminated, as the container may be marked so distinctly that it is impossible to avoid noticing whether it contains a poisonous or a non-poisonous powder. Furthermore the possibility of any remnants of poisonous powder in corners within the blower getting mixed up with non-poisonous powder is avoided.

This object is obtained by the combination of a blower device, a detachable container provided at its upper end with a nozzle and at its lower end with a hole corresponding to the delivery hole of the blower, and means for attaching the container within the blower in such a manner that the hole in the lower end of the container is disposed to communicate with the delivery hole of the blower.

By providing the container with a nozzle at the one end and a hole at the other end as described it is possible for the manufacturer of the powder to supply a container the holes of which are sealed when filled. The sealing of the hole and nozzle may preferably be performed by means of removable stoppers, so that the container may be closed again when only a portion of the contents has been removed.

Figure 1:
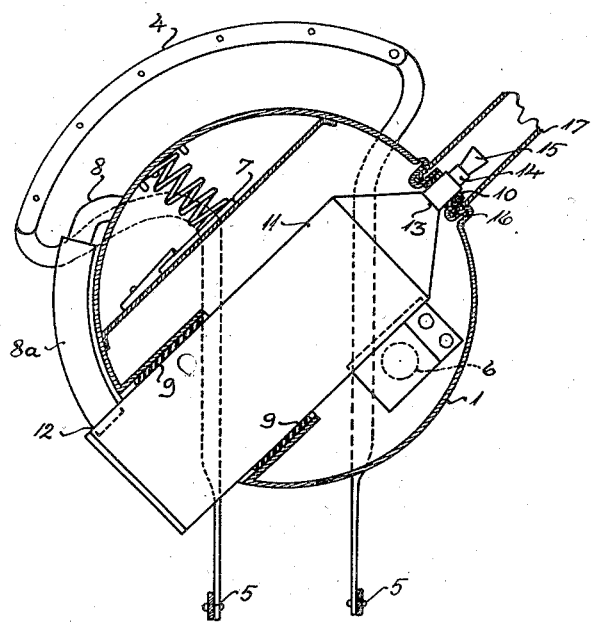
Figure 2:
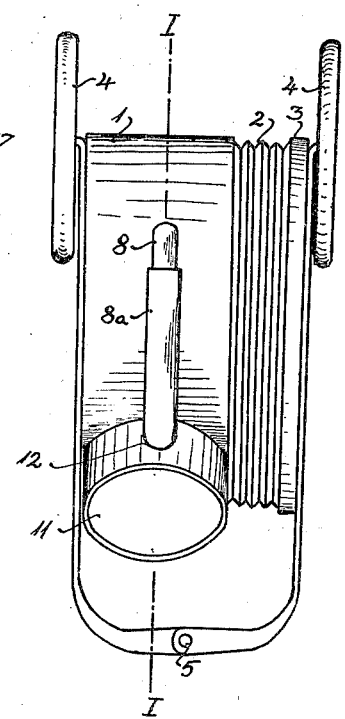
Figure 3:
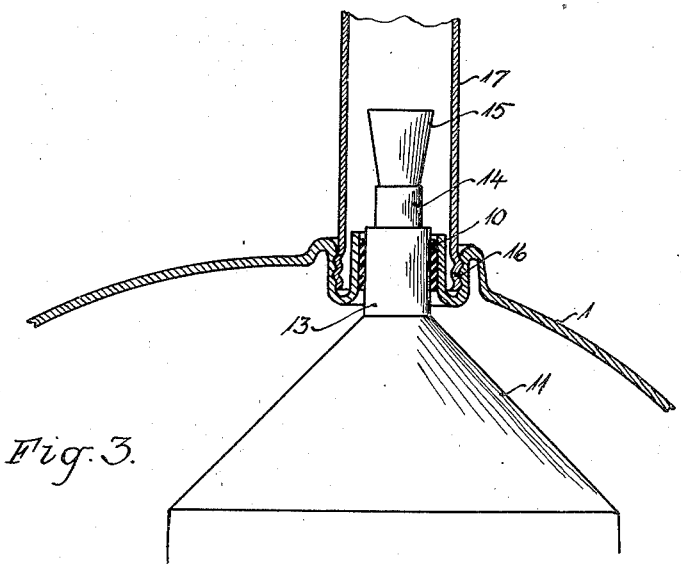

One manner of construction of the device according to the invention is illustrated in the accompanying drawing, where Fig. 1 is a sectional view, taken on the line I—I of Fig. 2, of a blower with powder container inserted in position, Fig. 2 a rear view of same, and Fig. 3 a detail on a somewhat larger scale.

With reference to the drawing the powder blower consists of an air chamber 1, which by means of bellows 2 is connected to a lid 3. The chamber and the lid have each extensions, which at their lower ends are interconnected in pairs by means of hinges 5, and by means of handles 4 on the chamber and the lid respectively these parts may be moved to and from each other, turning on the hinges, with simultaneous contraction and expansion of the bellows. The chamber 1 is provided with one-way valves 6 and 7, whereby, when the handles 4 are moved from each other, air enters the chamber from outside, and, when they are moved toward each other, air is forced from the chamber into the part 8. Furthermore the chamber 1 is provided with an air escape formed to the shape of a pipe 8 with a curved extension 8a through the open end of which the air from the chamber 1 is ejected upon the compression of the bellows.

Within the wall of the chamber 1 there are arranged two oppositely disposed holes, a large and a small hole. The large hole has a lining 9 and is dimensioned so as to allow the insertion of the body of a container 11, while the small hole is provided with a lining 10 and is dimensioned to allow the insertion of the container nozzle. The linings 9 and 10 are made of any pliable material and are made to fit closely around the container body and nozzle respectively, thereby producing an airtight fitting when the container is in position within the blower, and furthermore serve to hold the container rigidly in position. The lower end of the container is provided with a hole 12 which is positioned in such a manner that when the container is in its proper position within the blower, this hole communicates with the open end of the air escape extension 8a to the effect that air ejected through this extension enters the lower end of the container through the said hole 12 for the purpose of ejecting the contents of the container through a spout 13 at the opposite end of the container.

To allow the insertion of the sealed container into the blower, the nozzle is stepped in such a manner that the spout 13 has a somewhat narrower tubular extension 14, into which a stopper 15 is inserted. This allows a free passage of the nozzle through the hole in the blower, and after insertion the stopper 15 may be removed and afterwards replaced.

The edge of the hole for the nozzle is bent inwardly and as illustrated in Fig. 3 provided with a screw thread 16 for the application of a correspondingly threaded spreader 17 after the removal of the stopper 15.

The powder blower according to the present invention operates in such a manner that upon operating the bellows after having inserted the powder container, compressed air is delivered through the pipe 8 to the interior of the container through the hole 12, and the powder is thereby blown out through the hole in the extension 14 of the nozzle. By this the possibility of the contents of the container coming into contact with the interior of the blower is eliminated entirely, and accordingly no deposits will take place therein.

I claim:—

A powder blower for the purpose described, in which the blower device consists of a chamber having a cylindrical wall in which are formed two oppositely disposed holes for a detachable powder container, a lid, a hinge device connecting the chamber and lid to allow their movement to and from each other, handles on the chamber and lid for moving them, bellows arranged between and interconnecting the chamber and lid, linings along the edges of the two holes in the cylindrical chamber wall for providing an airtight fitting between the container and the blower, an air escape for the air compressed by the bellows, one end of the powder container having an air inlet hole disposed to communicate with the said air escape, and a nozzle at the opposite end of the container, said nozzle projecting through one of the holes in the cylindrical chamber wall.

JENS PETER HANSEN.